(Model.)

C. H. KOYL.
PLATE FOR SECONDARY BATTERIES.

No. 276,974.  Patented May 1, 1883.

*Porous Plate Consisting of coal tar and a polarizable substance united by Carbonization*

Witnesses.
Robert Everett
E. A. Dick

Inventor
Charles H. Koyl
By Marcellus Bailey
his atty.

UNITED STATES PATENT OFFICE.

CHARLES H. KOYL, OF BALTIMORE, MARYLAND, ASSIGNOR TO THE AMERICAN ELECTROPHORE COMPANY, OF WASHINGTON, D. C.

PLATE FOR SECONDARY BATTERIES.

SPECIFICATION forming part of Letters Patent No. 276,974, dated May 1, 1883.

Application filed January 10, 1883. (Specimens.)

*To all whom it may concern:*

Be it known that I, CHARLES H. KOYL, of Baltimore, in the State of Maryland, have invented certain new and useful Improvements in the Manufacture of Plates for Secondary Batteries, of which the following is a specification, reference being had to the annexed drawing, which represents graphically the composition of my improved plate.

The plate in which my invention is comprised is a porous plate composed of a hydrocarbon base and a polarizable substance—for instance, an intimate mixture of coal-tar, such as obtained from gas-works, and red lead—which mixture is baked in the same way as ordinary carbon plates are baked. By this means the polarizable substance is disseminated throughout the plate and is held in permanent union with the carbonized base. It is essential that the plate should be porous, so that the battery solution may penetrate to its interior, and I have found that this result can readily be obtained by running the mixture into the form of plates which are baked or carbonized without being preliminarily pressed to an extent which will give them the solidity and denseness of ordinary carbon plates. The product thus obtained is a porous plate throughout which the polarizable substance is in a condition and position to be reached and acted on by the solution, and in which the pores or interior passages are of such dimensions as to permit the oxidizing action to go on throughout its interior without danger of breaking up or rupturing it.

One way in which I have practiced making the plate is as follows: Take coal-tar in a fluid state, or thereabouts, and a polarizable substance—such as red lead or other form of lead in a finely-divided condition—using in one hundred parts, say, from sixty to eighty parts, by weight, of the lead, and thoroughly and intimately mix these two substances together. There is thus obtained a mixture which, if not already of liquid consistency, can, by application of moderate heat, be brought to that condition sufficiently to permit it to be run into a mold of the shape required for the plate; or, if the mixture be of pasty consistency, it can be put into the mold and brought into shape to fill the same properly by suitable means, care being taken in so doing not to subject the mixture to pressure of any great extent. The interior of the mold is of course preliminarily greased, as usual, to prevent sticking, and, after the mold is filled, the top of the plate is sprinkled with sand or, preferably, comminuted carbon. The mold-box, which is of cast-iron, is then closed, and the joints are luted so as to exclude air, after which the box is placed in the ordinary baking-furnace and the plate is baked to carbonization in the usual way. After this operation the plate is taken out from the mold, and its faces are preferably ground off so as to remove the surface film, after which it is ready for use. The effect of the baking operation on the red lead is to reduce it to the form of metallic lead, which is in a finely-divided condition, and is disseminated throughout the plate. The carbon body of the plate has a very porous structure, with large pores or passages, which admit the battery solution to the interior of the plate, which in fact is percolated by the liquid.

Experience has demonstrated that plates of this kind are formed and charged with great expedition, and that they are very efficient and have a relatively high storage capacity.

What I claim as new and of my invention is—

1. A porous carbonized plate for secondary batteries, composed primarily of a mixture of a hydrocarbon and a finely-divided polarizable substance, baked together, substantially as hereinbefore set forth.

2. The improvement in the art of making plates for secondary batteries, consisting in mixing finely-divided lead or other polarizable substance and coal-tar or other hydrocarbon base, in substantially the proportions stated, forming the mixture into plates, and then carbonizing or baking the same, substantially as hereinbefore set forth.

In testimony whereof I have hereunto set my hand this 8th day of January, 1883.

CHARLES H. KOYL.

Witnesses:
BENJ. PRICE,
THOS. KELL BRADFORD.